United States Patent
Hong et al.

(10) Patent No.: US 12,426,030 B2
(45) Date of Patent: Sep. 23, 2025

(54) USER SCHEDULING AND CODEBOOK ALLOCATION METHOD FOR MAXIMIZING SUM FREQUENCY EFFICIENCY IN NON-ORTHOGONAL MULTIPLE ACCESS SYSTEM

(71) Applicants: SAMSUNG ELECTRONICS CO., LTD., Suwon-si (KR); POSTECH RESEARCH AND BUSINESS DEVELOPMENT FOUNDATION, Pohang-si (KR)

(72) Inventors: Sungnam Hong, Suwon-si (KR); Namyoon Lee, Pohang-si (KR); Jiwook Choi, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 464 days.

(21) Appl. No.: 17/760,292

(22) PCT Filed: Feb. 2, 2021

(86) PCT No.: PCT/KR2021/001337
§ 371 (c)(1),
(2) Date: Aug. 5, 2022

(87) PCT Pub. No.: WO2021/157990
PCT Pub. Date: Aug. 12, 2021

(65) Prior Publication Data
US 2023/0106785 A1    Apr. 6, 2023

(30) Foreign Application Priority Data
Feb. 6, 2020 (KR) .................. 10-2020-0014234

(51) Int. Cl.
*H04W 72/044* (2023.01)
*H04W 72/0453* (2023.01)
*H04W 72/54* (2023.01)

(52) U.S. Cl.
CPC ... *H04W 72/0466* (2013.01); *H04W 72/0453* (2013.01); *H04W 72/54* (2023.01)

(58) Field of Classification Search
CPC ......... H04W 72/0466; H04W 72/0453; H04W 72/54; H04L 5/0037; H04L 25/03;
(Continued)

(56) References Cited

U.S. PATENT DOCUMENTS

| 10,014,891 B2 | 7/2018 | Sagong et al. |
| 10,193,735 B2 | 1/2019 | Kwon et al. |

(Continued)

FOREIGN PATENT DOCUMENTS

| KR | 10-2016-0144915 A | 12/2016 |
| KR | 10-2018-0109654 A | 10/2018 |

OTHER PUBLICATIONS

European Patent Office, "Supplementary European Search Report," dated Dec. 23, 2022, in connection with European Patent Application No. 21750296.2, 16 pages.
(Continued)

*Primary Examiner* — Gary Mui
*Assistant Examiner* — Mohammad Safwaan Alam

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

8 Claims, 11 Drawing Sheets

(58) Field of Classification Search
CPC .... H04L 25/03898; Y02D 30/70; H04B 7/0456; H04B 7/0626; H04J 1/00
See application file for complete search history.

(56) References Cited

U.S. PATENT DOCUMENTS

| | | | |
|---|---|---|---|
| 10,856,172 | B2 | 12/2020 | Hojeij et al. |
| 2018/0152273 | A1* | 5/2018 | Kim ............... H04B 7/0617 |
| 2018/0184432 | A1* | 6/2018 | Ryoo ............... H04W 88/08 |
| 2018/0249452 | A1* | 8/2018 | Lee ............... H04L 5/0021 |
| 2019/0020525 | A1 | 1/2019 | Perotti et al. |
| 2019/0165916 | A1 | 5/2019 | Lee et al. |
| 2020/0028611 | A1 | 1/2020 | Lee et al. |

OTHER PUBLICATIONS

Simon et al., "Resource Allocation for Uplink SCMA NOMA in Heterogeneous Networks", 2019 IEEE AFRICON, IEEE, Sep. 25, 2019, 6 pages.

Li et al., "Joint codebook assignment and power allocation for SCMA based on capacity with Gaussian input", 2016 IEEE/CIC International Conference on Communications In China (ICCC), IEEE, Jul. 27, 2016, 6 pages.

Korean Intellectual Property Office, "Office Action," issued May 11, 2022, in connection with Korean Patent Application No. 10-2020-0014234, 8 pages.

International Search Report and Written Opinion of the International Searching Authority in connection with International Application No. PCT/KR2021/001337 issued May 4, 2022, 10 pages.

Dong et al., "An Efficient SCMA Codebook Optimization Algorithm Based on Mutual Information Maximization," Research Article, Hindawi, Wireless Communications and Mobile Computing, vol. 2018, Article ID 8910907, Apr. 1, 2018, 14 pages.

Choi et al., "Spatial Lattice Modulation for MIMO Systems," IEEE Transactions on Signal Processing, vol. 66, Issue: 12, Jun. 15, 2018, 33 pages.

Choi et al., "Joint User Selection, Power Allocation, and Precoding Design with Imperfect CSIT for Multi-Cell MU-MIMO Downlink Systems," IEEE Transactions on Wireless Communications, vol. 19, Issue: 1, Jan. 2020, 14 pages.

Communication pursuant to Article 94(3) EPC dated Dec. 20, 2024, in connection with European Patent Application No. 21750296.2, 11 pages.

* cited by examiner

USER SCHEDULING AND CODEBOOK ALLOCATION METHOD FOR MAXIMIZING SUM FREQUENCY EFFICIENCY IN NON-ORTHOGONAL MULTIPLE ACCESS SYSTEM

CROSS-REFERENCE TO RELATED APPLICATIONS

This application is a 371 of International Application No. PCT/KR2021/001337, filed Feb. 2, 2021, which claims priority to Korean Patent Application No. 10-2020-0014234, filed Feb. 6, 2020, the disclosures of which are herein incorporated by reference in their entirety.

BACKGROUND

1. Field

Embodiments of the disclosure relate to a scheduling method in a non-orthogonal multiple access (NOMA) system and, more particularly, to a method in which the base station calculates the sum frequency efficiency of the NOMA system by using fading values of the base station and user equipments, selects a user equipment allowed to transmit based on this, and allocates a NOMA codebook to be transmitted by the selected user equipment.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As 4th generation (4G) wireless communication systems have recently been commercialized, it has become possible to transmit large amounts of data at a high speed through wireless communication systems. Correspondingly, the demand for high-definition video streaming or large-capacity data download has also greatly increased, and studies on 5th generation (5G) communication systems are being actively conducted to satisfy these demands. As a method to achieve high data transmission rates in 5G systems, massive multiple-input multiple-output (massive MIMO) technology that uses much more base station antennas in the mmWave band compared with existing 4G systems is being considered, and NOMA multiple access technologies in which multiple users transmit and receive at the same time while sharing multiple resources are attracting attention.

NOMA refers to a technology in which multiple users simultaneously access resources such as time, frequency, and code. Therefore, compared to orthogonal multiple access (OMA), one of the advantages of NOMA is that more users can be supported with the same time-frequency resources, and thus the frequency efficiency of the cellular system can be improved. NOMA has recently been actively researched in academia and industry, and is being discussed as a next-generation communication standard. Uplink NOMA technologies can be classified into scrambling-based NOMA, spreading-based NOMA, coding-based NOMA, and interleaving-based NOMA. Typically, sparse code multiple access (SCMA) is a coding-based NOMA technology, and in SCMA, N subcarriers are used to support K (>N) users, and each user equipment transmits a spare codebook. Since these codebooks are designed to minimize interference between users, low-complexity decoding is possible using a message passing algorithm.

The NOMA system is promising for machine-to-machine (M2M) communication services in which data communication between devices is performed without direct human manipulation or intervention. One of the reasons is that high-density machine type communication (MTC) devices are expected to exist in the M2M system. According to the 5G standards, a myriad of devices for Internet of things (IOT) services must be accessible through MTC; specifically, massive MTC must efficiently support the transmission characteristics of high-density devices corresponding to 106 per 1 km2. In such a system, as the system performance difference becomes large according to transmitting terminal groups, it is required to select some terminals among multiple MTC terminals and allocate a codebook through efficient scheduling algorithms.

SUMMARY

Previously developed 4G communication systems utilize an OMA scheme such as orthogonal frequency division multiple access (OFDMA). In the case of OFDMA, communication is performed using multiple carriers, and multiple user equipments (UEs) can be supported due to orthogonality between subcarriers. However, in 5G communication systems, as the amount of data required by users increases exponentially, the NOMA technology is being considered to increase the transmission rate of the system. The disclosure relates to a method for user scheduling and NOMA codebook allocation in a NOMA system, and develops a frequency efficiency calculation method and a low-complexity scheduling algorithm for the NOMA system in this regard.

In order to achieve the above object, each base station in the disclosure obtains channel state information (CSI) of user equipments located in the coverage area for scheduling, and calculates the sum frequency efficiency for all combinations of users and NOMA codebooks based on the CSI information. The disclosure proposes a method for calculating the sum frequency efficiency of a general NOMA system. In addition, two schemes are proposed to calculate the sum frequency efficiency with low complexity; the first scheme uses the capacity upper-bound of the NOMA system derived under the assumption that each user equipment transmits a Gaussian signal, and the second scheme uses approximated mutual information derived according to a specific NOMA codebook. Additionally, a scheduling process using the sum frequency efficiency calculation method proposed in the disclosure is included.

The disclosure for solving the above problems relates to a method performed by a base station in a wireless communication system, and the method includes: receiving channel state information from a plurality of terminals; calculating a sum frequency efficiency of a non-orthogonal multiple access (NOMA) system based on the received channel state information; selecting a terminal based on the calculated sum frequency efficiency; allocating a codebook to the selected terminal; and transmitting an index of the allocated codebook to the terminal, wherein the sum frequency efficiency is calculated based on the mutual information.

In some examples, the mutual information is $$I(\bar{x}; \bar{y} | H) = \sum_{\bar{x}_i \in \mathcal{X}} \frac{1}{|\mathcal{X}|} \int_{\bar{y}} f(\bar{y} | \bar{x} = \bar{x}_i, H) \log_2 \frac{f(\bar{y} | \bar{x} = \bar{x}_i, H)}{f(\bar{y} | H)} d\bar{y}.$$

In some examples, the terminal transmits a signal of a Gaussian distribution, a capacity upper bound is set for the mutual information, and the capacity upper bound is $$I(\bar{x}; \bar{y} | \bar{H}) \leq \sum_{n=1}^{N} \log\left(1 + \frac{\sum_{k=1}^{K_{tot}} h_k[n]^2 f_{k,n} p_{k,n}}{N_0}\right).$$

In some examples, the mutual information is $$\hat{I}(\bar{x}; \bar{y} | \bar{H}) = 2\log_2 M^K - \log_2 \sum_{\bar{x}_i \in \mathcal{X}} \sum_{\bar{x}_j \in \mathcal{X}} \exp\left(-\frac{\|\bar{H}(\bar{x}_i - \bar{x}_j)\|^2}{2N_0}\right).$$

In some examples, allocating a codebook uses a greedy scheduling algorithm.

Another example of the disclosure relates to a method performed by a terminal in a wireless communication system, and the method includes: transmitting channel state information to a base station; and transmitting an index of an allocated codebook to the base station, wherein a sum frequency efficiency of a non-orthogonal multiple access (NOMA) system is calculated by the base station based on the transmitted channel state information, the terminal is selected based on the calculated sum frequency efficiency, the codebook is allocated to the selected terminal, and the sum frequency efficiency is calculated based on the mutual information.

In other examples of the disclosure, a base station includes: a transceiver capable of transmitting and receiving at least one signal; and a controller coupled to the transceiver, wherein the controller is configured to: receive channel state information from a plurality of terminals; calculate a sum frequency efficiency of a non-orthogonal multiple access (NOMA) system based on the received channel state information; select a terminal based on the calculated sum frequency efficiency; allocate a codebook to the selected terminal; and transmit an index of the allocated codebook to the terminal, wherein the sum frequency efficiency is calculated based on the mutual information.

In other examples of the disclosure, a terminal includes: a transceiver capable of transmitting and receiving at least one signal; and a controller coupled to the transceiver, wherein the controller is configured to: transmit channel state information to a base station; and transmit an index of an allocated codebook to the base station, and wherein a sum frequency efficiency of a non-orthogonal multiple access (NOMA) system is calculated by the base station based on the transmitted channel state information, the terminal is selected based on the calculated sum frequency efficiency, the codebook is allocated to the selected terminal, and the sum frequency efficiency is calculated based on mutual information.

According to the disclosure as described above, when terminals allowed to transmit and plural NOMA codebooks are given, user scheduling and codebook allocation are integrally performed based on fading information of the terminals. Thereby, as an advantage, not only interference between users is minimized, but also the sum frequency efficiency of the transmitting terminal is maximized.

DETAILED DESCRIPTION

Figure 1:
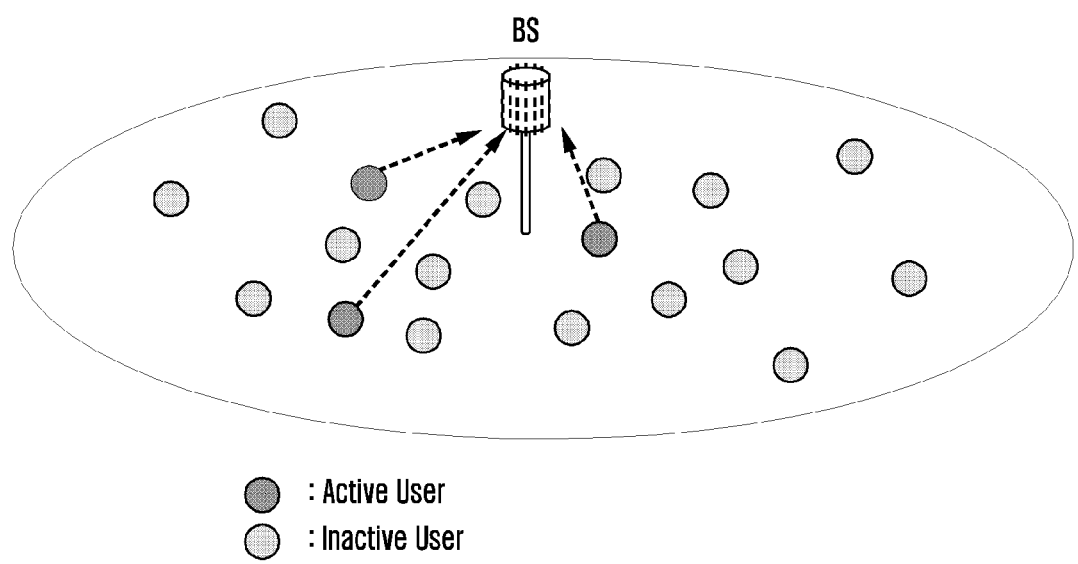
FIG. 1 illustrates a configuration of transceivers in a wireless communication system.

Hereinafter, embodiments of the disclosure will be described in detail with reference to the accompanying drawings. It should be noted that the same components in the drawings are denoted by the same reference numerals as much as possible. In describing the disclosure, when it is determined that a detailed description of a related disclosed technology or constitution may unnecessarily obscure the subject matter of the disclosure, the detailed description thereof will be abbreviated or omitted.

First Embodiment

This embodiment relates to a method of calculating sum frequency efficiency according to a NOMA codebook in a non-orthogonal multiple access system. Specifically, this embodiment relates to a system model and a sum frequency calculation method for a non-orthogonal multiple access system.

FIG. 1 illustrates a configuration of transceivers in a wireless communication system.

With reference to FIG. 1, the base station performs user scheduling and codebook allocation based on the received channel information, and feeds back scheduling information to each UE. In this case, the UEs that have received a grant signal can perform signal transmission according to uniquely assigned NOMA codebook indexes.

Figure 2:
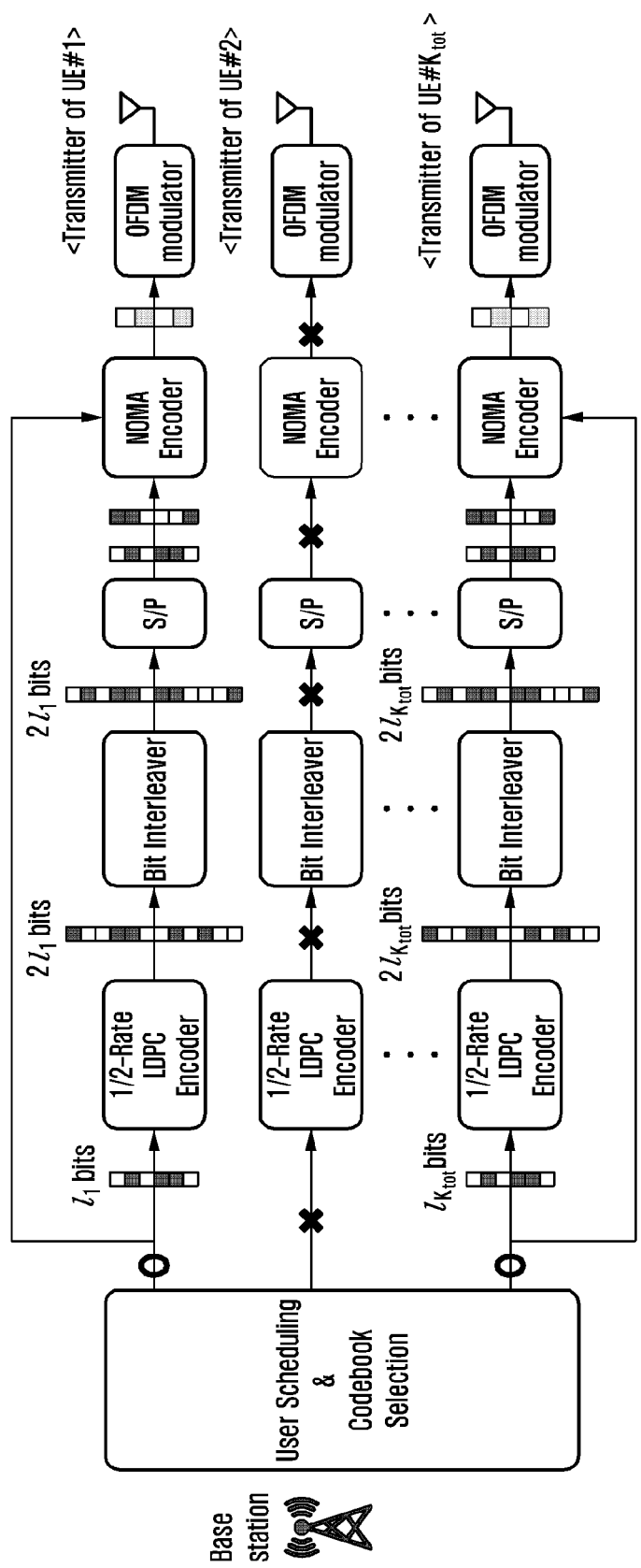
FIG. 2 illustrates a system model for a non-orthogonal multiple access system.

FIG. 2 illustrates a system model for a non-orthogonal multiple access system.

Figure 3:
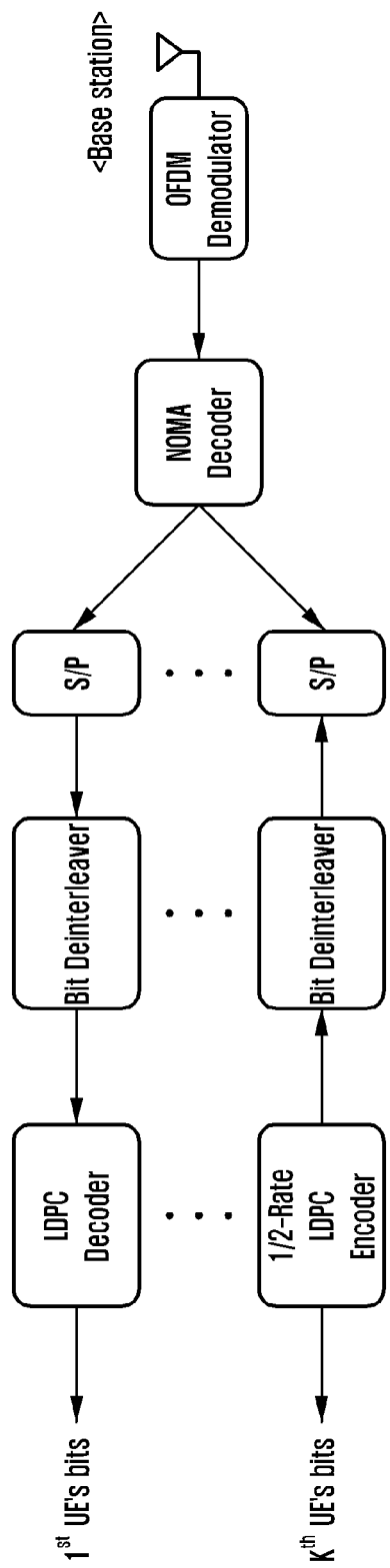
FIG. 3 illustrates a system model for a non-orthogonal multiple access system.

FIG. 3 illustrates a system model for a non-orthogonal multiple access system.

With reference to FIG. 2, it is assumed that a group of some users are selected for transmission; specifically, it is assumed that N orthogonal resources (subcarriers) are shared, and a NOMA system in which K users out of a total of $K_{tot}$ users in a cell simultaneously accesses the base station is considered. Here, it is assumed that there are 1 NOMA codebooks that users can use and that cooperation between users is not possible.

In a case where 1, 2, . . . , K-th users among $k_{tot}$ users are scheduled to transmit, without loss of generality, the integrated system model of a non-orthogonal multiple access system can be represented as Equation 1 below.

$$\begin{bmatrix} y[1] \\ y[2] \\ \vdots \\ y[N] \end{bmatrix} = \sum_{k=1}^{K} \begin{bmatrix} h_k[1] & & & \\ & h_k[2] & & \\ & & \ddots & \\ & & & h_k[N] \end{bmatrix} \begin{bmatrix} x_k[1] \\ x_k[2] \\ \vdots \\ x_k[N] \end{bmatrix} + \begin{bmatrix} n[1] \\ n[2] \\ \vdots \\ n[N] \end{bmatrix} \quad \langle \text{Equation 1} \rangle$$

Here, y[n] is a signal received through the n-th subcarrier, and $x_k$[n] is a signal transmitted by the k-th user through the n-th subcarrier. In the case of the channel matrix, as an OFDM modulator is used, it can be represented by a diagonal matrix having $h_k[1]$, $h_k[2]$, . . . , $h_k[N]$ as diagonal elements, and $h_k$[n] is a narrowband channel experienced by the n-th subcarrier of the k-th user. n[i] is a noise signal of the i-th subcarrier, which is a Gaussian noise signal having an average of 0.

If Equation 1 above is represented in a matrix form, it can be equivalently represented as Equation 2 below.

$$\bar{y} = [H_1 \ H_2 \ \ldots \ H_K] \begin{bmatrix} x_1 \\ x_2 \\ \vdots \\ x_K \end{bmatrix} + \bar{n} \quad \langle \text{Equation 2} \rangle$$

$$= \bar{H}\bar{x} + \bar{n}$$

In Equation 2, $\bar{y}$, $H_k$, $x_k$, $\bar{n}$ are represented respectively as in Equation 3 below.

$$\bar{y} = [y[1]y[2] \ldots y[N]]^T$$

$$H_k = \text{diag}[h_k[1]h_k[2] \ldots h_k[N]]^T$$

$$x_k = [x_k[1]x_k[2] \ldots x_k[N]]^T$$

$$\bar{n} = [n[1]n[2] \ldots n[N]]^T \quad \text{Equation 3}$$

Here, it is assumed that signal transmitted by the k-th user is one of the codewords of codebook $x_k$, and the total number of possible codewords is M. Similarly, $\bar{x}$ also corresponds to one of the codewords of codebook $\bar{x}_k$ that combines all the codebooks of the transmitting users.

The sum frequency efficiency of the NOMA system can be calculated from the value of mutual information $I(\bar{x},\bar{y}|H)$ for Equation 2, and is given as Equation 4 according to the definition of the mutual information.

$$I(\bar{x}; \bar{y} | H) = h(\bar{y} | \bar{H}) - h(\bar{n}) \quad \langle \text{Equation 4} \rangle$$

$$= \sum_{\bar{x}_i \in X} \frac{1}{|X|} \int_{\bar{y}} f(\bar{y} | \bar{x} = \bar{x}_i, \bar{H}) \log_2 \frac{f(\bar{y} | \bar{x} = \bar{x}_i, \bar{H})}{f(\bar{y} | \bar{H})} d\bar{y}$$

Here, $f(\bar{y}|\bar{H})$ and $f(\bar{y}|\bar{x}_i,\bar{H})$ are given as in Equation 5 when the noise signal follows a Gaussian distribution (mean 0, variance N0).

$$f(\bar{y} | \bar{H}) = \frac{1}{|X|} \sum_{\bar{x}_i \in X} \frac{1}{(\pi N_0)^N} \exp\left(-\frac{\|\bar{y} - \bar{H}\bar{x}_i\|^2}{N_0}\right) \quad \langle \text{Equation 5} \rangle$$

$$f(\bar{y} | x_i \bar{H}) = \frac{1}{(\pi N_0)^N} \exp\left(-\frac{\|\bar{y} - \bar{H}\bar{x}_i\|^2}{N_0}\right)$$

By substituting Equation 5 into Equation 4, an accurate mutual information value can be calculated from Equation 6 below.

$$I(\bar{x}; \bar{y} \mid \bar{H}) = \log|\mathcal{X}| - \frac{1}{|\mathcal{X}|} \sum_{\bar{x}_i \in \mathcal{X}} \mathbb{E}_{\bar{n}}\left[\log_2 \sum_{\bar{x}_j \in \mathcal{X}} \exp\left(-\frac{\|\bar{H}(\bar{x}_i - \bar{x}_j) + \bar{n}\|^2 - \|\bar{n}\|^2}{N_0}\right)\right]$$ ⟨Equation 6⟩

Here, the channel matrix has the following structure.

$$\bar{H} = \begin{bmatrix} h_1[1] & & & \ldots & h_K[1] & & \\ & h_1[2] & & \ldots & & h_K[2] & \\ & & \ddots & \ldots & & & \ddots \\ & & & h_1[N] & \ldots & & & h_K[N] \end{bmatrix}$$ ⟨Equation 7⟩

The mutual information derived from Equation 6 may provide an optimal metric for calculating the sum frequency efficiency when each user's channel and NOMA codebook are given. However, there is a disadvantage in that a Monte Carlo method must be used to calculate the average value (expectation) for noise, and high computational complexity is required. Therefore, in this embodiment, two metrics are additionally derived to calculate the sum frequency efficiency with low complexity. The first metric is the capacity upper-bound of the NOMA system derived under the assumption that each UE transmits a Gaussian signal, and the second metric is approximated mutual information derived according to specific NOMA codebooks.

The upper-bound of the mutual information is derived when the transmission signal $\bar{x}$ follows a Gaussian distribution (mean 0, variance N0), and is the same as Equation 8 below.

$$I(\bar{x}; \bar{y} \mid H) \leq \log((\pi e)^N \det(N_0 I_N + \bar{H} K_{\bar{x}} \bar{H}^H)) - N\log(\pi e N_0)$$ ⟨Equation 8⟩
$$= \log\det\left(I_N + \frac{1}{N_0} \bar{H} K_{\bar{x}} \bar{H}^H\right)$$

Here, $K_{\bar{x}}$ in Equation 8 means the covariance matrix of $\bar{x}$. In the case of the NOMA system considered in this embodiment, as there is no cooperation between different users, signals independent of each other are transmitted. Hence, the transmission signals between different users are uncorrelated with each other ($E(x_i x_j^H)=0$, for $i \neq j$). Using this, the covariance matrix $K_{\bar{x}}$ of $\bar{x}$ is calculated as follows.

$$K_{\bar{x}} = \begin{pmatrix} E(x_1 x_1^H) & \ldots & E(x_1 x_K^H) \\ \vdots & \ddots & \vdots \\ E(x_K x_1^H) & \ldots & E(x_1 x_K^H) \end{pmatrix} = \begin{pmatrix} E(x_1 x_1^H) & \ldots & 0_N \\ \vdots & \ddots & \vdots \\ 0_N & \ldots & E(x_1 x_K^H) \end{pmatrix}$$ ⟨Equation 9⟩

If the constellation of NOMA transmission signals is generated to be diagonally symmetric, $E(x_i x_j^H)$ is represented as in Equation 10 below.

$$E(x_j x_j^H) = \begin{pmatrix} E(x_k[1]^2) & \ldots & E(x_k[1]x_k[N]^*) \\ \vdots & \ddots & \vdots \\ E(x_k[N]x_k[1]^*) & \ldots & E(x_k[N]^2) \end{pmatrix} =$$ ⟨Equation 10⟩
$$\begin{pmatrix} E(x_k[1]^2) & \ldots & 0 \\ \vdots & \ddots & \vdots \\ 0 & \ldots & E(x_k[N]^2) \end{pmatrix}$$

By substituting Equation 10 into Equation 9, $K_{\bar{x}}$ is simplified as follows.

$$K_{\bar{x}} = \mathrm{diag}(E(x_1[1]^2) \ldots E(x_1[N]^2) \ldots E(x_K[1]^2) \ldots E(x_K[N]^2))$$ ⟨Equation 11⟩

As a result, when the result of Equation 10 is substituted into Equation 11, the upper-bound of the mutual information is derived as Equation 12.

$$I(\bar{x}; \bar{y} \mid H) \leq \log\det\left(I_N + \frac{1}{N_0} \bar{H} K_{\bar{x}} \bar{H}^H\right)$$ ⟨Equation 12⟩
$$= \log\det\begin{pmatrix} 1 + \frac{\sum_{k=1}^{K} h_k[1]^2 E(x_k[1]^2)}{N_0} & \ldots & 0 \\ \vdots & \ddots & \vdots \\ 0 & \ldots & 1 + \frac{\sum_{k=1}^{K} h_k[N]^2 E(x_k[N]^2)}{N_0} \end{pmatrix}$$
$$= \sum_{n=1}^{N} \log\left(1 + \frac{\sum_{k=1}^{K} h_k[n]^2 E(x_k[n]^2)}{N_0}\right)$$

$$I(\bar{x}; \bar{y} \mid H) \leq \log\det\left(I_N + \frac{1}{N_0} \bar{H} K_{\bar{x}} \bar{H}^H\right)$$
$$= \log\det\begin{pmatrix} 1 + \frac{\sum_{k=1}^{K} h_k[1]^2 E(x_k[1]^2)}{N_0} & \ldots & 0 \\ \vdots & \ddots & \vdots \\ 0 & \ldots & 1 + \frac{\sum_{k=1}^{K} h_k[N]^2 E(x_k[N]^2)}{N_0} \end{pmatrix}$$
$$= \sum_{n=1}^{N} \log\left(1 + \frac{\sum_{k=1}^{K} h_k[n]^2 E(x_k[n]^2)}{N_0}\right)$$

In this embodiment, since it is assumed that the first to K-th users among $K_{tot}$ users are scheduled, all $E(x_k[n]^2)$ values are 1. In general, it is represented as Equation 13 below, where $f_{k,n}$ is a function indicating whether the k-th user uses the n-th subcarrier and has one of values {0,1}, and $P_{k,n}$ denotes the power of a symbol transmitted by the k-th user through the n-th subcarrier. In this embodiment, Equation 13 is called the capacity upper-bound.

$$I(\bar{x};\bar{y}|\overline{H}) \leq \sum_{n=1}^{N} \log\left(1 + \frac{\sum_{k=1}^{K_{tot}} h_k[n]^2 f_{k,n} p_{k,n}}{N_0}\right) \quad \langle\text{Equation 13}\rangle$$

Equation 13 can be approximated in various ways and used. For example, if Taylor's theorem is used, the log(1+x) term can be expressed as $$\sum_{n \geq 0} \frac{(-1)^n x^{n+1}}{n+1},$$

so that Equation 13 can be approximated using only a limited number of terms. In the case of derived Equation 13, since a Gaussian distribution is assumed for a transmission signal, there is a disadvantage that it is composed of a simple function of the channel between the base station and UEs rather than a function for specific NOMA codebooks.

One of methods to compensate for the above disadvantage is to calculate the mutual information $I(\bar{x},\bar{y}|H)$ without Gaussian distribution assumption for the transmission signal. However, accurate calculation of the mutual information requires high computational complexity. Hence, the mutual information can be approximated for low complexity, and if Jensen's inequality is used, the lower-bound for the term $I(\bar{x},\bar{y}|H)$ in Equation 4 is given as in Equation 14.

$$h(y|H) \geq -\log 2 \mathbb{E}_{y}[f(y|H)] \quad \langle\text{Equation 14}\rangle$$

If Equation 14 is calculated using $f(\bar{y}|\overline{H})$ of Equation 5, it is given as Equation 15 by definition.

$$h(\bar{y}|\overline{H}) \geq -\log_2 \int_{\bar{y}} \left(\frac{1}{|X|} \sum_{\bar{x}_i \in X} \frac{1}{(\pi N_0)^N} \exp\left(-\frac{\|\bar{y} - \overline{H}\bar{x}_i\|^2}{N_0}\right)\right)^2 d\bar{y} \quad \langle\text{Equation 15}\rangle$$

When the order of integration and summation in Equation 15 is changed, the lower bound of $I(\bar{x},\bar{y}|H)$ is given by Equation 16.

$$h(\bar{y}|\overline{H}) \geq \quad \langle\text{Equation 16}\rangle$$

$$2\log_2 |X|(\pi N_0)^N - \log_2 \sum_{\bar{x}_i \in X} \sum_{\bar{x}_j \in X} \int_{\bar{y}} e^{-\frac{\|\bar{y}-\overline{H}\bar{x}_i\|^2}{N_0}} e^{-\frac{\|\bar{y}-\overline{H}\bar{x}_j\|^2}{N_0}} d\bar{y}$$

If integration is performed on Equation 16, Equation 17 may be obtained.

$$h(\bar{y}|\overline{H}) \geq 2\log_2 |X| + \log_2 (\pi N_0)^N + \quad \langle\text{Equation 17}\rangle$$

$$N\log_2 2 - \log_2 \sum_{\bar{x}_i \in X} \sum_{\bar{x}_j \in X} \exp\left(-\frac{\|\overline{H}(\bar{x}_i - \bar{x}_j)\|^2}{2N_0}\right)$$

By substituting Equation 17 above into Equation 5, the lower-bound for the mutual information $I(\bar{x}:\bar{y}|H)$ can be obtained, and the lower-bound of the mutual information is denoted by $\mathcal{I}^{Low}(\bar{x}:\bar{y}|\overline{H})$ for convenience.

$\mathcal{I}^{Low}(\bar{x}:\bar{y}|\overline{H})$ can be derived as Equation 18.

$$\mathcal{I}^{Low}(\bar{x};\bar{y}|\overline{H}) = \quad \langle\text{Equation 18}\rangle$$

$$2\log_2 |X| + N\log_2 \frac{2}{e} - \log_2 \sum_{\bar{x}_i \in X} \sum_{\bar{x}_j \in X} \exp\left(-\frac{\|\overline{H}(\bar{x}_i - \bar{x}_j)\|^2}{2N_0}\right)$$

When the offset caused by the extremely low and high SNR is removed, an approximated expression $\tilde{\mathcal{I}}(\bar{x}:\bar{y}|\overline{H})$ for the mutual information is derived as in Equation 19. In this embodiment, Equation 19 is called approximated mutual information. In the case of Equation 19 as in Equation 13, Equation 19 can be further approximated for usage based on the characteristics of log and exponential functions.

$$\tilde{\mathcal{I}}(\bar{x};\bar{y}|\overline{H}) = 2\log_2 M^K - \log_2 \sum_{\bar{x}_i \in X} \sum_{\bar{x}_j \in X} \exp\left(-\frac{\|\overline{H}(\bar{x}_i - \bar{x}_j)\|^2}{2N_0}\right) \quad \langle\text{Equation 19}\rangle$$

Figure 4:
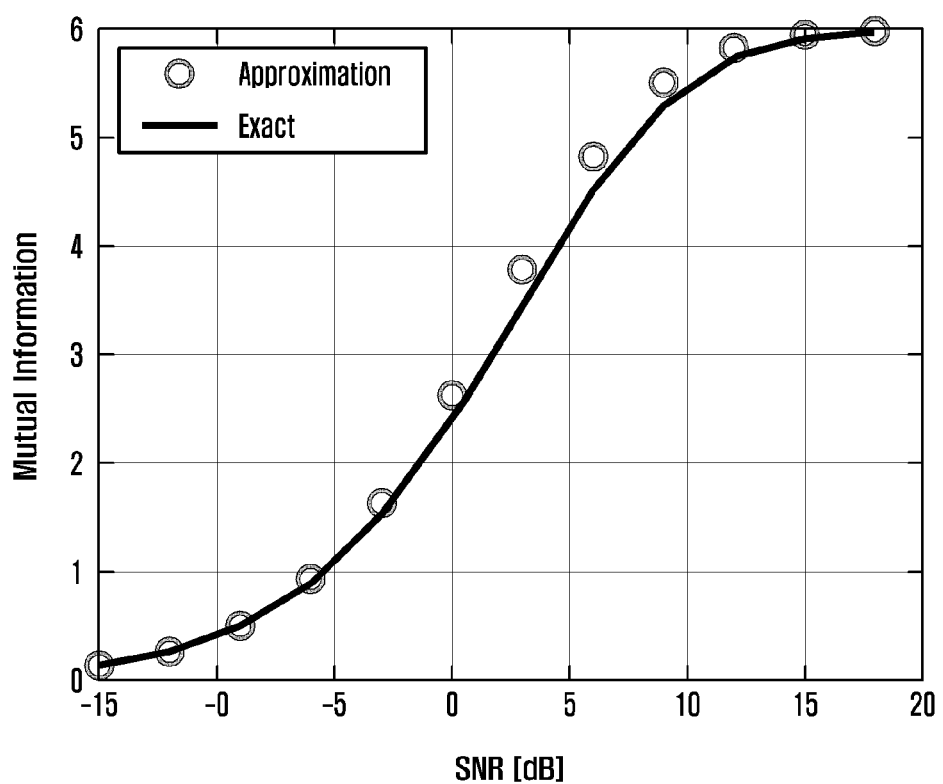
FIG. 4 is a diagram comparing the approximated mutual information derived in this embodiment with the actual mutual information value through an experiment.

FIG. 4 is a diagram comparing the approximated mutual information derived in this embodiment with the actual mutual information value through an experiment. The NOMA method used in this experiment is sparse code multiple access (SCMA), the fast Fourier transform (FFT) size is 4096, and the number of subcarriers shared by transmitting users is set to 4. As shown in FIG. 4, it can be seen that the proposed approximated mutual information is very similar to the actual value over the whole SNR range.

Second Embodiment

This embodiment relates to a user scheduling and codebook allocation algorithm for a non-orthogonal multiple access system.

In this embodiment, two algorithms for user scheduling and codebook allocation in a non-orthogonal multiple access system are described. Specifically, an optimal scheduling algorithm considering all combinations of users and codebooks and a greedy scheduling algorithm for reducing complexity are included.

Figure 5:
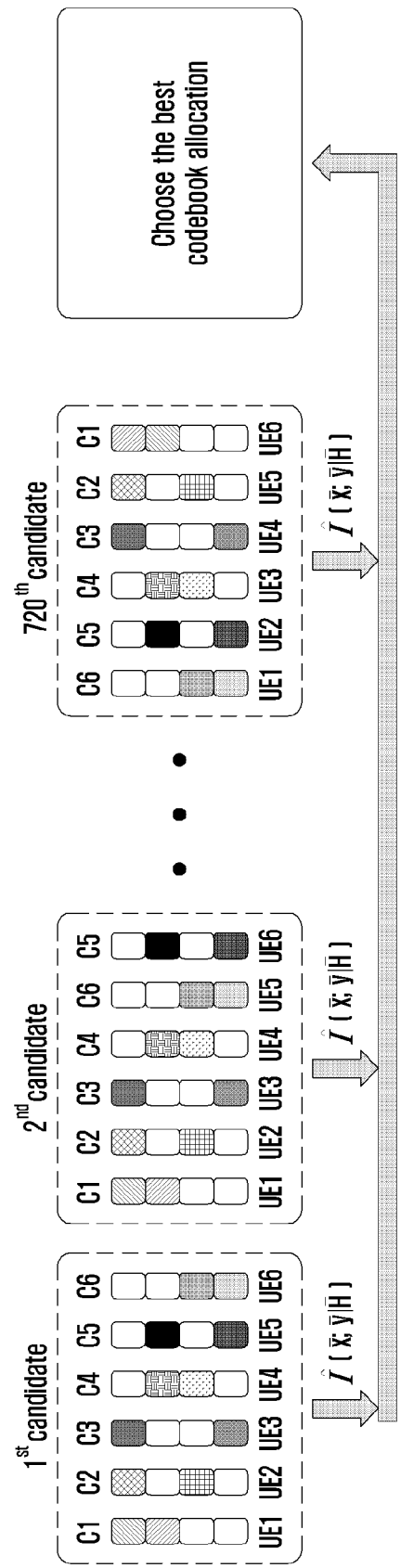
FIG. 5 is a diagram for explaining an example of selecting a combination having a maximum value by calculating sum frequency efficiencies for all combinations when there are six users and six codebooks in the case of an optimal scheduling algorithm.

FIG. 5 is a diagram for explaining an example of selecting a combination having a maximum value by calculating sum frequency efficiencies for all combinations when there are six users and six codebooks in the case of an optimal scheduling algorithm.

With reference to FIG. 5, when there are 6 users and 6 codebooks, the optimal scheduling algorithm may calculate sum frequency efficiencies for all combinations and select a combination with a maximum value.

Figure 6:
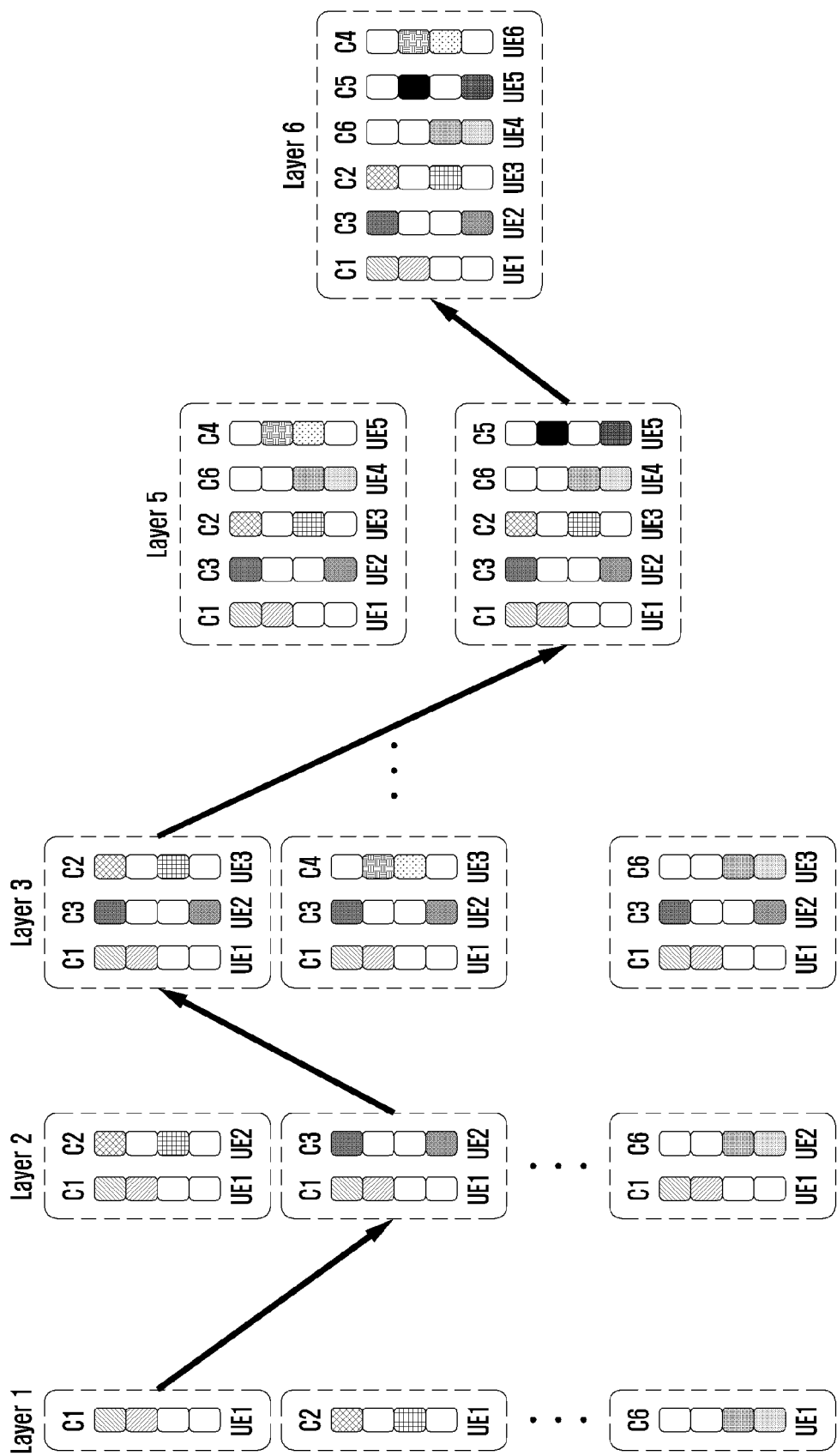
FIG. 6 is a diagram for explaining an example of selecting a combination having a maximum value by calculating sum frequency efficiencies as the number of users gradually increases in the case of a greedy scheduling algorithm.

FIG. 6 is a diagram for explaining an example of selecting a combination having a maximum value by calculating sum frequency efficiencies as the number of users gradually increases in the case of a greedy scheduling algorithm.

With reference to FIG. 6, since the greedy scheduling algorithm allocates a codebook as the number of users gradually increases, there is an advantage of reducing complexity.

For a specific embodiment for user scheduling and codebook allocation, a NOMA system having parameters such as $K_{tot}=4, K=3, L=3$ (total number of users=4, number of users to be selected=3, number of codebooks=3) is considered. Here, it is assumed that three NOMA codebooks are given as follows.

$$C_1 = \left( \begin{bmatrix} +1 \\ +1 \end{bmatrix}, \begin{bmatrix} -1 \\ -1 \end{bmatrix} \right),$$ ⟨Equation 20⟩

$$C_2 = \left( \begin{bmatrix} +1 \\ 0 \end{bmatrix}, \begin{bmatrix} -1 \\ 0 \end{bmatrix} \right), C_3 = \left( \begin{bmatrix} 0 \\ +1 \end{bmatrix}, \begin{bmatrix} 0 \\ -1 \end{bmatrix} \right)$$

The user selection and codebook allocation function is defined as $\pi=[\pi(1), \pi(2), \ldots, \pi(K)]$, where $\pi(k)=0, 1, \ldots, L$. For example, when $\pi=[1,2,0,3)]$, this means that the third UE is not selected, and the first, second, and fourth UEs use the first, second, and third codebooks, respectively. If the defined user selection and codebook allocation function is used, the optimization problem is represented as Equations 21 to 23 below. Equation 21 corresponds to an optimization problem of maximizing the mutual information, Equation 22 corresponds to an optimization problem of maximizing the capacity upper-bound, and Equation 23 corresponds to an optimization problem of maximizing the mutual information.

$$\pi^* = \underset{\pi}{\mathrm{argmax}} \left\{ \log_2 M^K - \frac{1}{\overline{X}_\pi} \sum_{\overline{x}_{\pi,m} \in \overline{X}_\pi} \mathbb{E}_{\overline{n}} \left[ \log_2 \sum_{\overline{x}_{\pi,j} \in \overline{X}_\pi} \exp\left( -\frac{\|\overline{H}(\overline{x}_{\pi,m} - \overline{x}_{\pi,j}) + \overline{n}\|_2^2 - \|\overline{n}\|_2^2}{\sigma^2} \right) \right] \right\}$$ ⟨Equation 21⟩

$$\pi^* = \underset{\pi}{\mathrm{argmax}} \sum_{n=1}^{N} \log\left(1 + \frac{\sum_{k=1}^{K_{tot}} h_k[n]^2 f_{k,n} p_{k,n}}{N_0}\right)$$ ⟨Equation 22⟩

$$\pi^* = \underset{\pi}{\mathrm{argmax}} \left\{ 2\log_2 M^K - \log_2 \sum_{\overline{x}_{\pi,i} \in \overline{X}_\pi} \sum_{\overline{x}_{\pi,j} \in \overline{X}_\pi} \exp\left( -\frac{\|\overline{H}_\pi(\overline{x}_{\pi,i} - \overline{x}_{\pi,j})\|^2}{2N_0} \right) \right\}$$ ⟨Equation 23⟩

As all the above optimization problems correspond to a combinatorial optimization problem, the optimal solution can be obtained by calculating Equations 23 to 25 for all possible combinations of users and codebooks. In this embodiment, a total of 24 (=4*3*2) user selection and codebook allocation functions exist and are listed in the following equation.

$$\pi_1 = [1\ 2\ 3\ 0]\ \pi_5 = [1\ 3\ 2\ 0]\ \pi_9 = [2\ 1\ 3\ 0]\ \pi_{13} = [2\ 3\ 1\ 0]\ \pi_{17} = [3\ 1\ 2\ 0]\ \pi_{21} = [3\ 2\ 1\ 0]$$
$$\pi_2 = [1\ 2\ 0\ 3]\ \pi_6 = [1\ 3\ 0\ 2]\ \pi_{10} = [2\ 1\ 0\ 3]\ \pi_{14} = [2\ 3\ 0\ 1]\ \pi_{18} = [3\ 1\ 0\ 2]\ \pi_{22} = [3\ 2\ 0\ 1]$$
$$\pi_3 = [1\ 0\ 2\ 3]\ \pi_7 = [1\ 0\ 3\ 2]\ \pi_{11} = [2\ 0\ 1\ 3]\ \pi_{15} = [2\ 0\ 3\ 1]\ \pi_{19} = [3\ 0\ 1\ 2]\ \pi_{23} = [3\ 0\ 2\ 1]$$
$$\pi_4 = [0\ 1\ 2\ 3]\ \pi_8 = [0\ 1\ 3\ 2]\ \pi_{12} = [0\ 2\ 1\ 3]\ \pi_{16} = [0\ 2\ 3\ 1]\ \pi_{20} = [0\ 3\ 1\ 2]\ \pi_{24} = [0\ 3\ 2\ 1]$$ ⟨Equation 24⟩

For example, the joint codebook $\overline{X}_{\pi_2}$ and effective channel $\overline{H}_{\pi_1}$ corresponding to an index function $\pi_2$ can be composed as shown in Equations 25 and 26 below.

$$\overline{X}_{\pi_2} = \left( \begin{bmatrix} +1 \\ +1 \\ +1 \\ 0 \\ 0 \\ +1 \end{bmatrix}, \begin{bmatrix} +1 \\ +1 \\ +1 \\ 0 \\ 0 \\ -1 \end{bmatrix}, \begin{bmatrix} +1 \\ +1 \\ -1 \\ 0 \\ 0 \\ +1 \end{bmatrix}, \begin{bmatrix} +1 \\ +1 \\ -1 \\ 0 \\ 0 \\ -1 \end{bmatrix}, \begin{bmatrix} -1 \\ -1 \\ +1 \\ 0 \\ 0 \\ +1 \end{bmatrix}, \begin{bmatrix} -1 \\ -1 \\ +1 \\ 0 \\ 0 \\ -1 \end{bmatrix}, \begin{bmatrix} -1 \\ -1 \\ -1 \\ 0 \\ 0 \\ +1 \end{bmatrix}, \begin{bmatrix} -1 \\ -1 \\ -1 \\ 0 \\ 0 \\ -1 \end{bmatrix} \right)$$ ⟨Equation 25⟩

$$\overline{H}_{\pi_2} = \begin{bmatrix} h_1[1] & 0 & h_2[1] & 0 & h_4[1] & 0 \\ 0 & h_1[2] & 0 & h_2[2] & 0 & h_4[2] \end{bmatrix}$$ ⟨Equation 26⟩

Similarly, $f_{k,n}$ and $P_{k,n}$ can be computed as follows.

$$F = \begin{bmatrix} f_{1,1} & f_{1,2} \\ f_{2,1} & f_{2,2} \\ f_{3,1} & f_{3,2} \\ f_{4,1} & f_{4,2} \end{bmatrix} = \begin{bmatrix} 1 & 1 \\ 1 & 0 \\ 0 & 0 \\ 0 & 1 \end{bmatrix}$$ ⟨Equation 27⟩

$$P = \begin{bmatrix} p_{1,1} & p_{1,2} \\ p_{2,1} & p_{2,2} \\ p_{3,1} & p_{3,2} \\ p_{4,1} & p_{4,2} \end{bmatrix} = \begin{bmatrix} 1 & 1 \\ 1 & 0 \\ 0 & 0 \\ 0 & 1 \end{bmatrix}$$

Through the above method, the optimization problem for all possible user and codebook combinations can be solved. However, there is a disadvantage that the complexity increases exponentially as the number of codebooks or the number of users to be scheduled increases. Therefore, a greedy algorithm can be considered to lower the complexity, and the computation can proceed as follows.

At first step, the capacity upper-bound or approximated mutual information is obtained for a case where there is only one user as shown below, and there are a total of 12 possibilities.

$$\pi_1 = [1\ 0\ 0\ 0]\ \pi_4 = [0\ 1\ 0\ 0]\ \pi_7 = [0\ 0\ 1\ 0]\ \pi_{10} = [0\ 0\ 0\ 1]$$
$$\pi_2 = [2\ 0\ 0\ 0]\ \pi_5 = [0\ 2\ 0\ 0]\ \pi_8 = [0\ 0\ 2\ 0]\ \pi_{11} = [0\ 0\ 0\ 2]$$
$$\pi_3 = [3\ 0\ 0\ 0]\ \pi_6 = [0\ 2\ 0\ 0]\ \pi_9 = [0\ 0\ 3\ 0]\ \pi_{12} = [0\ 0\ 0\ 3]$$

$$\pi_1 = [1\ 0\ 0\ 0]\ \pi_4 = [0\ 1\ 0\ 0]\ \pi_7 = [0\ 0\ 1\ 0]\ \pi_{10} = [0\ 0\ 0\ 1]$$
$$\pi_2 = [2\ 0\ 0\ 0]\ \pi_5 = [0\ 2\ 0\ 0]\ \pi_8 = [0\ 0\ 2\ 0]\ \pi_{11} = [0\ 0\ 0\ 2]$$
$$\pi_3 = [3\ 0\ 0\ 0]\ \pi_6 = [0\ 2\ 0\ 0]\ \pi_9 = [0\ 0\ 3\ 0]\ \pi_{12} = [0\ 0\ 0\ 3]$$

⟨Equation 28⟩

If $\pi_1 = [1\ 0\ 0\ 0]$ is selected at first step, at second step, the optimization function value is calculated for the following six combinations for two users.

$$\pi_{13} = [1\ 2\ 0\ 0]\ \pi_{15} = [1\ 0\ 2\ 0]\ \pi_{17} = [1\ 0\ 0\ 2]$$ ⟨Equation 29⟩
$$\pi_{14} = [1\ 3\ 0\ 0]\ \pi_{16} = [1\ 0\ 3\ 0]\ \pi_{18} = [1\ 0\ 0\ 3]$$
$$\pi_{13} = [1\ 2\ 0\ 0]\ \pi_{15} = [1\ 0\ 2\ 0]\ \pi_{17} = [1\ 0\ 0\ 2]$$
$$\pi_{14} = [1\ 3\ 0\ 0]\ \pi_{16} = [1\ 0\ 3\ 0]\ \pi_{18} = [1\ 0\ 0\ 3]$$

If $\pi_{13} = [1\ 2\ 0\ 0]$ is selected at second step, at last step, computation is performed for the following two cases only.

$$\pi_{19} = [1\ 2\ 3\ 0]\ \pi_{20} = [1\ 2\ 0\ 3]$$ Equation 30⟩

To verify the effect of the disclosure, the coded bit error rates of a related-art technique (random scheduling) and the technique proposed in the disclosure were compared through a simulation for verification. The NOMA method used in this simulation was multi-user shared access (MUSA), the FFT size was 4096, and the number of subcarriers shared by transmitting users was set to 4. A rate-½ code (336,772) was used as the channel code, and the ETU model was used as the channel model.

Figure 7:
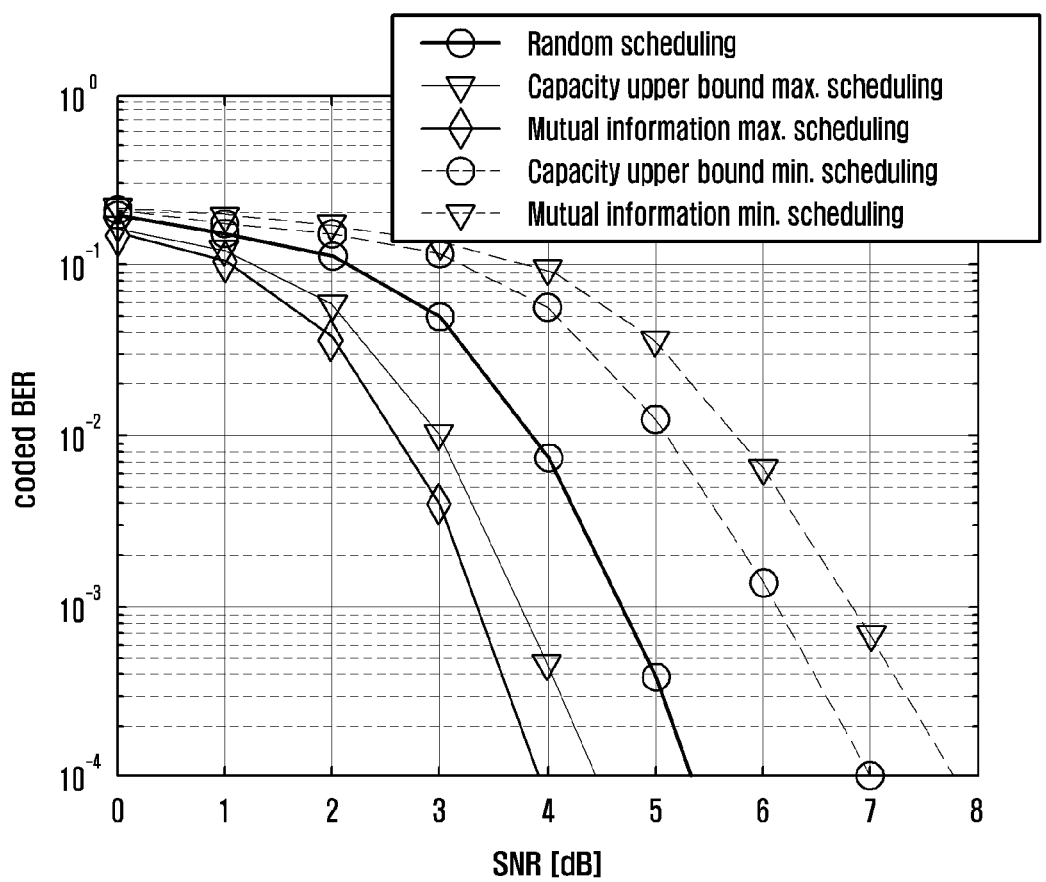
FIG. 7 is a diagram for comparing the coded bit error rates of the related art and this embodiment.

FIG. 7 is a diagram for comparing the coded bit error rates of the related art and this embodiment.

FIG. 7 compares the coded bit error rates when $k_{tot}=6$, K=6,L=6 and it can be seen that a maximum 1.5 dB SNR gain can be obtained compared to a related art technique. With reference to FIG. 7, the coded bit error rates are compared when $k_{tot}=(6,12,18)$,K=6, L=6, and it can be seen that the proposed technique can obtain a performance gain of up to 5 dB or more compared to a related-art technique as the total number of users in the cell increases.

Figure 8:
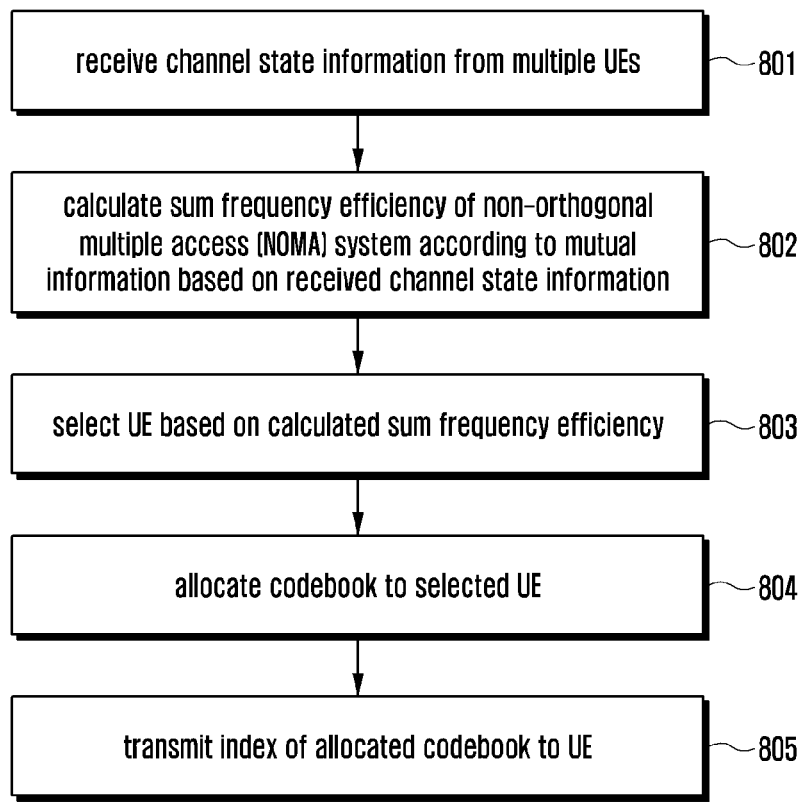
FIG. 8 is a diagram showing an embodiment of the disclosure.

FIG. 8 is a diagram showing an embodiment of the disclosure.

With reference to FIG. 8, the base station may receive channel state information from multiple UEs (operation 801). The base station may calculate the sum frequency efficiency of a non-orthogonal multiple access (NOMA) system based on the received channel state information (operation 802). The sum frequency efficiency can be calculated based on the mutual information. The mutual information may be $$I(\bar{x};\bar{y}|H) = \sum_{\bar{x}_i \in \mathcal{X}} \frac{1}{|\mathcal{X}|} \int_{\bar{y}} f(\bar{y}|\bar{x}=\bar{x}_i,H)\log_2 \frac{f(\bar{y}|\bar{x}=\bar{x}_i,H)}{f(\bar{y}|H)} d\bar{y}.$$

Or, the mutual information may be $$\hat{I}(\bar{x};\bar{y}|H) = 2\log_2 M^K - \log_2 \sum_{\bar{x}_i \in \mathcal{X}} \sum_{\bar{x}_j \in \mathcal{X}} \exp\left(-\frac{\|H(\bar{x}_i - \bar{x}_j)\|^2}{2N_0}\right)$$

Alternatively, the UE may transmit a signal of a Gaussian distribution, in which case a capacity upper bound is set for the mutual information, and the capacity upper bound may be $$\bar{I}(\bar{x};\bar{y}|H) \leq \sum_{n=1}^{N} \log\left(1 + \frac{\sum_{k=1}^{K_{tot}} h_k[n]^2 f_{k,n} p_{k,n}}{N_0}\right).$$

The base station may select a UE based on the calculated sum frequency efficiency (operation 803). The base station may allocate a codebook to the selected UE (operation 804). The allocation may be performed by using a greedy scheduling algorithm. The base station may transmit the index of the allocated codebook to the UE (operation 805).

Figure 9:
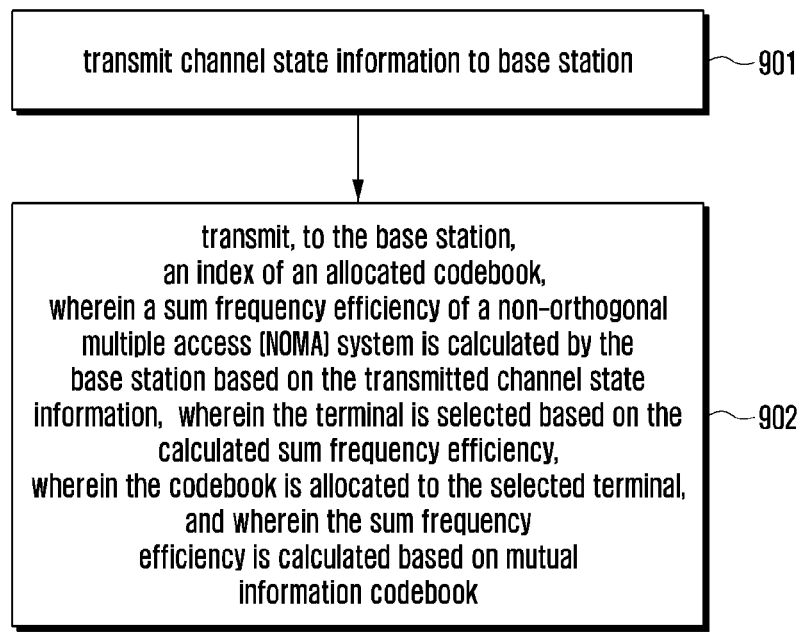
FIG. 9 is a diagram showing another embodiment of the disclosure.

FIG. 9 is a diagram showing another embodiment of the disclosure.

With reference to FIG. 9, the UE may transmit channel state information to the base station (operation 901). The UE may transmit the index of an allocated codebook to the base station (operation 902). Based on the transmitted channel state information, the sum frequency efficiency of a non-orthogonal multiple access (NOMA) system may be calculated by the base station. Based on the calculated sum frequency efficiency, the UE may be selected. A codebook may be allocated to the selected UE. The allocation may be performed by using a greedy scheduling algorithm. The sum frequency efficiency may be calculated based on the mutual information. The mutual information may be $$I(\bar{x};\bar{y}|H) = \sum_{\bar{x}_i \in \mathcal{X}} \frac{1}{|\mathcal{X}|} \int_{\bar{y}} f(\bar{y}|\bar{x}=\bar{x}_i,H)\log_2 \frac{f(\bar{y}|\bar{x}=\bar{x}_i,H)}{f(\bar{y}|H)} d\bar{y}$$

$$I(\bar{x};\bar{y}|H) = \sum_{\bar{x}_i \in \mathcal{X}} \frac{1}{|\mathcal{X}|} \int_{\bar{y}} f(\bar{y}|\bar{x}=\bar{x}_i,H)\log_2 \frac{f(\bar{y}|\bar{x}=\bar{x}_i,H)}{f(\bar{y}|H)} d\bar{y}.$$

Or, the mutual information may be $$\hat{I}(\bar{x};\bar{y}|H) = 2\log_2 M^K - \log_2 \sum_{\bar{x}_i \in \mathcal{X}} \sum_{\bar{x}_j \in \mathcal{X}} \exp\left(-\frac{\|H(\bar{x}_i - \bar{x}_j)\|^2}{2N_0}\right)$$

Alternatively, the UE may transmit a signal of a Gaussian distribution, in which case a capacity upper bound is set for the mutual information, and the capacity upper bound may be $$I(\bar{x};\bar{y}|H) \leq \sum_{n=1}^{N} \log\left(1 + \frac{\sum_{k=1}^{K_{tot}} h_k[n]^2 f_{k,n} p_{k,n}}{N_0}\right).$$

Figure 10:
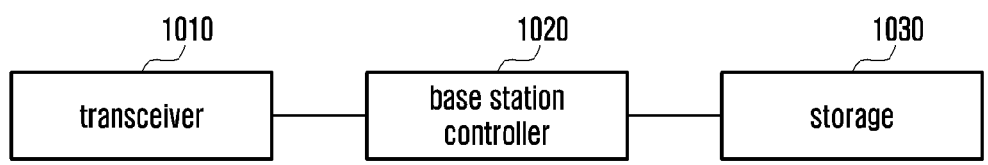
FIG. 10 is a diagram illustrating the structure of a base station according to an embodiment of the disclosure.

FIG. 10 is a diagram illustrating the structure of a base station according to an embodiment of the disclosure.

With reference to FIG. 10, the base station may include a transceiver 1010, a controller 1020, and a storage 1030. In the disclosure, the controller may be defined as a circuit, an application specific integrated circuit, or at least one processor.

The transceiver 1010 may transmit and receive signals to and from other network entities. The transceiver 1010 may transmit system information to, for example, a UE, and may transmit a synchronization signal or a reference signal.

The controller 1020 may control the overall operation of the base station according to embodiments proposed in the disclosure. For example, the controller 1020 may control signal flows between blocks to perform operations according to the flowchart described above. Specifically, the controller 1020 may control operations proposed in the disclosure to transmit remaining minimum system information (RMSI) in a multi-beam based system according to an embodiment of the disclosure.

The storage 1030 may store at least one of information transmitted and received through the transceiver 1010 or information generated through the controller 1020. For example, the storage 1030 may store scheduling information related to RMSI transmission, PDCCH time domain location and periodicity information related to RMSI, and the like.

Figure 11:
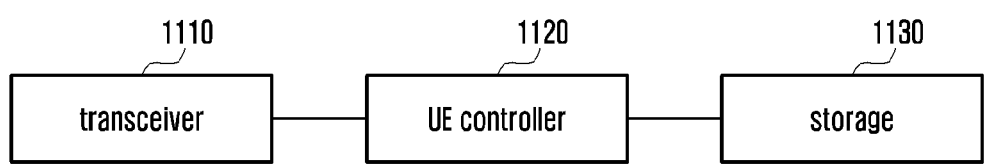
FIG. 11 is a diagram illustrating the structure of a terminal according to an embodiment of the disclosure.

FIG. 11 is a diagram illustrating the structure of a UE according to an embodiment of the disclosure.

With reference to FIG. 11, the UE may include a transceiver 1110, a controller 1120, and a storage 1130. In the disclosure, the controller may be defined as a circuit, an application specific integrated circuit, or at least one processor.

The transceiver 1110 may transmit and receive signals to and from other network entities. The transceiver 1110 may receive system information from, for example, a base station, and may receive a synchronization signal or a reference signal.

The controller 1120 may control the overall operation of the UE according to embodiments proposed in the disclosure. For example, the controller 1120 may control signal flows between blocks to perform operations according to the flowchart described above. Specifically, the controller 1120 may control operations proposed in the disclosure to receive remaining minimum system information (RMSI) in a multi-beam based system according to an embodiment of the disclosure.

The storage 1130 may store at least one of information transmitted and received through the transceiver 1110 or information generated through the controller 1120. For example, the storage 1130 may store scheduling information related to RMSI transmission, PDCCH time domain location and periodicity information related to RMSI, and the like.

The invention claimed is:

1. A method performed by a base station in a wireless communication system, the method comprising:
   receiving, from a plurality of terminals, channel state information;
   calculating a sum frequency efficiency of a non-orthogonal multiple access (NOMA) system based on the received channel state information;
   selecting a terminal based on the calculated sum frequency efficiency;
   allocating a codebook to the selected terminal; and
   transmitting, to the terminal, an index of the allocated codebook, wherein the sum frequency efficiency is calculated based on mutual information, and wherein:
   allocating the codebook using a greedy scheduling algorithm; and
   the mutual information is $$\hat{I}(\bar{x}; \bar{y} \mid \overline{H}) = 2\log_2 M^K - \log_2 \sum_{\bar{x}_i \in \overline{X}} \sum_{\bar{x}_j \in \overline{X}} \exp\left(-\frac{\|\overline{H}(\bar{x}_i - \bar{x}_j)\|^2}{2N_0}\right).$$

2. The method of claim 1, wherein:
   the terminal transmits a signal of a Gaussian distribution;
   a capacity upper bound is configured for the mutual information; and
   the capacity upper bound is $$I(\bar{x}; \bar{y} \mid \overline{H}) \le \sum_{n=1}^{N} \log\left(1 + \frac{\sum_{k=1}^{K_{tot}} h_k[n]^2 f_{k,n} p_{k,n}}{N_0}\right).$$

3. A method performed by a terminal in a wireless communication system, the method comprising:
   transmitting, to a base station, channel state information; and
   transmitting, to the base station, an index of an allocated codebook,
   wherein a sum frequency efficiency of a non-orthogonal multiple access (NOMA) system is calculated by the base station based on the transmitted channel state information,
   wherein the terminal is selected based on the calculated sum frequency efficiency,
   wherein the codebook is allocated to the selected terminal, and wherein the sum frequency efficiency is calculated based on mutual information, wherein:
   allocating the codebook using a greedy scheduling algorithm; and
   the mutual information is $$\hat{I}(\bar{x}; \bar{y} \mid \overline{H}) = 2\log_2 M^K - \log_2 \sum_{\bar{x}_i \in \overline{X}} \sum_{\bar{x}_j \in \overline{X}} \exp\left(-\frac{\|\overline{H}(\bar{x}_i - \bar{x}_j)\|^2}{2N_0}\right).$$

4. The method of claim 3, wherein:
   the terminal transmits a signal of a Gaussian distribution;
   a capacity upper bound is configured for the mutual information; and
   the capacity upper bound is $$I(\bar{x}; \bar{y} \mid \overline{H}) \le \sum_{n=1}^{N} \log\left(1 + \frac{\sum_{k=1}^{K_{tot}} h_k[n]^2 f_{k,n} p_{k,n}}{N_0}\right).$$

5. A base station comprising:

a transceiver capable of transmitting and receiving at least one signal; and a controller coupled to the transceiver, wherein the controller is configured to:

receive, from a plurality of terminals, channel state information;

calculate a sum frequency efficiency of a non-orthogonal multiple access (NOMA) system based on the received channel state information;

select a terminal based on the calculated sum frequency efficiency;

allocate a codebook to the selected terminal; and transmit, to the terminal, an index of the allocated codebook, wherein the sum frequency efficiency is calculated based on mutual information, and wherein:

allocating the codebook using a greedy scheduling algorithm; and the mutual information is $$\hat{I}(\bar{x};\bar{y}\,|\,\overline{H}) = 2\log_2 M^K - \log_2 \sum_{\bar{x}_i \in \bar{X}} \sum_{\bar{x}_j \in \bar{X}} \exp\left(-\frac{\|\overline{H}(\bar{x}_i - \bar{x}_j)\|^2}{2N_0}\right).$$

6. The base station of claim 5, wherein: the terminal transmits a signal of a Gaussian distribution; a capacity upper bound is configured for the mutual information; and the capacity upper bound is $$I(\bar{x};\bar{y}\,|\,\overline{H}) \le \sum_{n=1}^{N} \log\left(1 + \frac{\sum_{k=1}^{K_{tot}} h_k[n]^2 f_{k,n} p_{k,n}}{N_0}\right).$$

7. A terminal comprising:

a transceiver capable of transmitting and receiving at least one signal; and a controller coupled to the transceiver, wherein the controller is configured to:

transmit, to a base station, channel state information; and transmit, to the base station, an index of an allocated codebook, wherein a sum frequency efficiency of a non-orthogonal multiple access (NOMA) system is calculated by the base station based on the transmitted channel state information, wherein the terminal is selected based on the calculated sum frequency efficiency, wherein the codebook is allocated to the selected terminal, and wherein the sum frequency efficiency is calculated based on mutual information, and wherein:

allocating the codebook using a greedy scheduling algorithm; and the mutual information is $$\hat{I}(\bar{x};\bar{y}\,|\,\overline{H}) = 2\log_2 M^K - \log_2 \sum_{\bar{x}_i \in \bar{X}} \sum_{\bar{x}_j \in \bar{X}} \exp\left(-\frac{\|\overline{H}(\bar{x}_i - \bar{x}_j)\|^2}{2N_0}\right).$$

8. The terminal of claim 7, wherein:

the terminal transmits a signal of a Gaussian distribution;

a capacity upper bound is configured for the mutual information; and the capacity upper bound is $$I(\bar{x};\bar{y}\,|\,\overline{H}) \le \sum_{n=1}^{N} \log\left(1 + \frac{\sum_{k=1}^{K_{tot}} h_k[n]^2 f_{k,n} p_{k,n}}{N_0}\right).$$

* * * * *